United States Patent [19]
Guelich

[11] Patent Number: 5,841,020
[45] Date of Patent: Nov. 24, 1998

[54] APPARATUS AND METHOD FOR MIXING, MEASURING AND FORWARDING A MULTI-PHASE GAS MIXTURE

[75] Inventor: Johann Guelich, Winterthur, Switzerland

[73] Assignees: Total S.A., Puteaux, France; Sulzer Pumpen AG, Winterthur, Switzerland

[21] Appl. No.: 704,535
[22] PCT Filed: Mar. 21, 1995
[86] PCT No.: PCT/EP95/01054
§ 371 Date: Sep. 11, 1996
§ 102(e) Date: Sep. 11, 1996
[87] PCT Pub. No.: WO95/26494
PCT Pub. Date: Oct. 5, 1995

[30] Foreign Application Priority Data

Mar. 25, 1994 [CH] Switzerland .......... 00 905/94
Mar. 25, 1994 [CH] Switzerland .......... 00 906/94

[51] Int. Cl.⁶ ...................................... G01F 1/74
[52] U.S. Cl. .......... 73/19.12; 73/861.04; 73/200
[58] Field of Search .................. 73/861.04, 200, 73/19.1, 19.12, 61.44, 64.56, 53.01, 863.21; 366/142, 184

[56] References Cited

U.S. PATENT DOCUMENTS

| 4,468,962 | 9/1984 | Keech et al. ............... 73/200 |
| 4,476,719 | 10/1984 | Millar et al. ............... 73/200 |
| 5,396,807 | 3/1995 | Dowty et al. ............ 73/861.04 |
| 5,526,684 | 6/1996 | Liu et al. ................ 73/861.04 |
| 5,679,905 | 10/1997 | Wardle ................... 73/861.04 |

FOREIGN PATENT DOCUMENTS

| 0 493 886 | 7/1992 | European Pat. Off. . |
| 2 610 105 | 7/1988 | France . |
| 2 089 049 | 6/1982 | United Kingdom . |
| WO/90/13859 | 11/1990 | WIPO . |

*Primary Examiner*—Michael Brock
*Attorney, Agent, or Firm*—Townsend and Townsend and Crew LLP

[57] ABSTRACT

The container serves for mixing and measuring multi-phase fluids which are conducted in via a supply tube. The liquid and gaseous components are separated in the container and collected into a liquid volume as well as a gas volume. A liquid surface forms at the separating layer between the gas volume and the liquid volume, the actual height of which is measured by a sensor. The fluids located in the container are drawn back off out of the container in the direction of flow in a flowing manner via a removal apparatus which comprises at least one removal apparatus as well as a drainage means adjoining it and are thereupon mixed. The drainage means is arranged vertical to the liquid surface and has openings which lie partly below and partly above the liquid surface during normal operation of the container. The drainage means has a Venturi nozzle in the region of the inlet opening in order to measure the flow rate of the gaseous component which flows through the inlet opening into the drainage means. A pressure sensor is mounted in the region of the gas volume in order to measure the pressure of the gaseous component. A signal evaluation apparatus which receives the measured values calculates a total flow rate, a flow rate of the liquid components, as well as a flow rate of the gaseous components from the measured values.

19 Claims, 7 Drawing Sheets

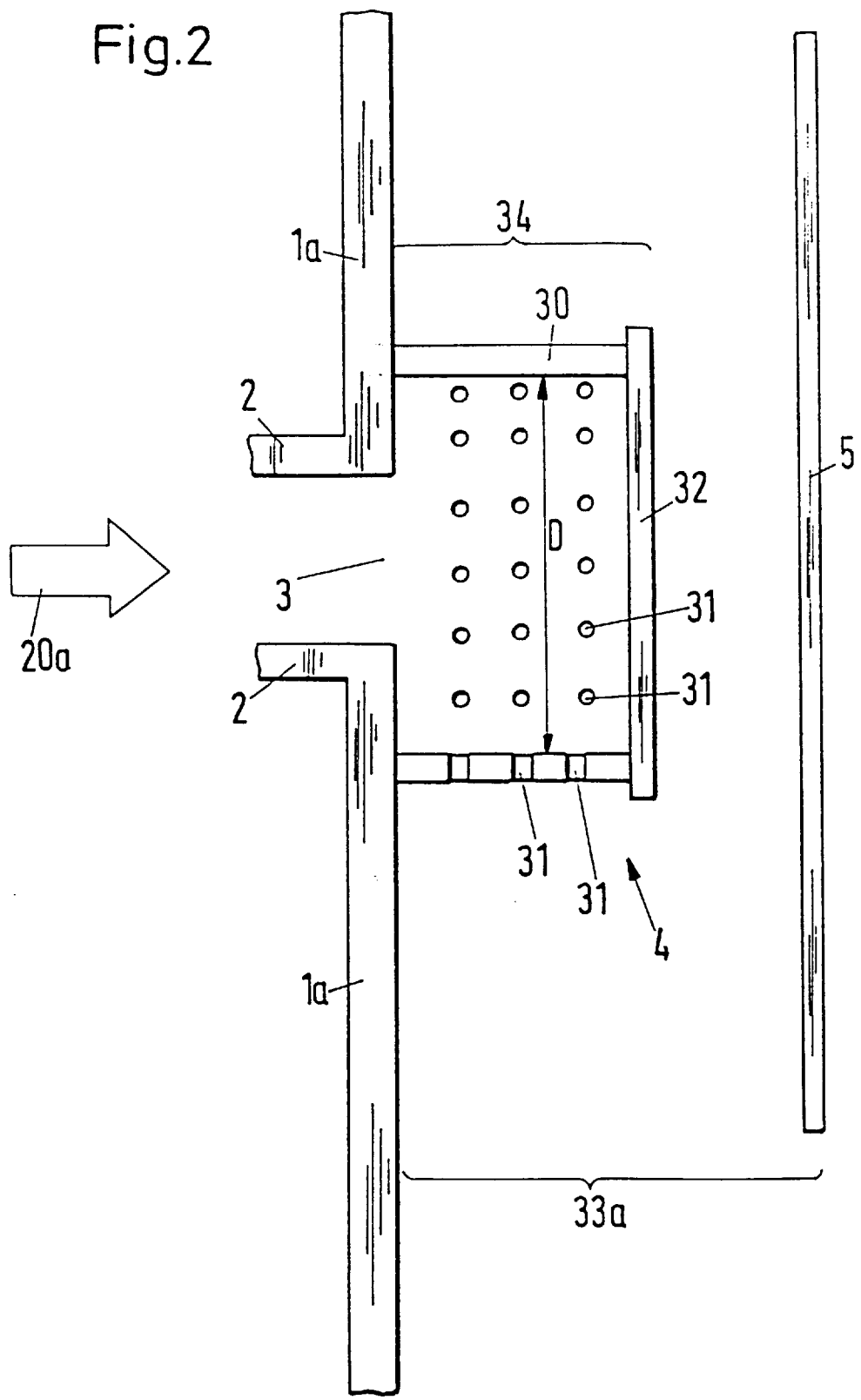

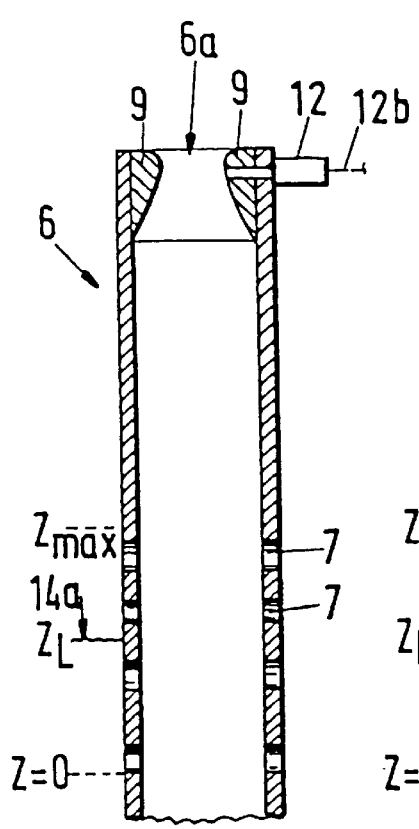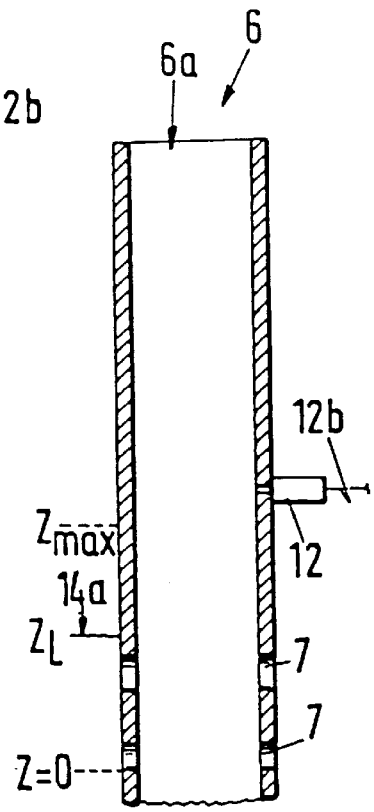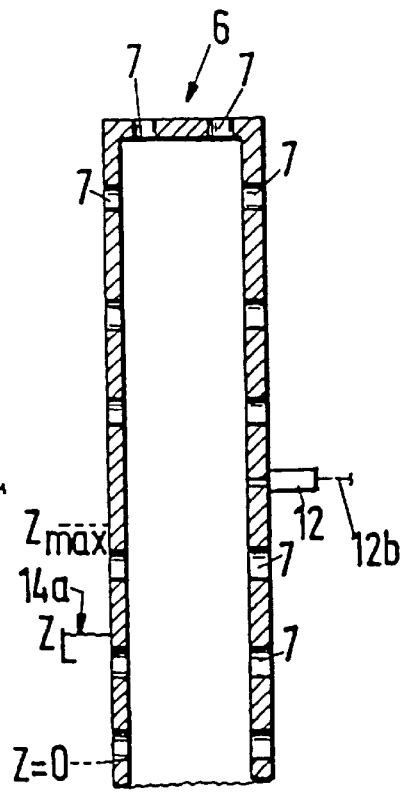

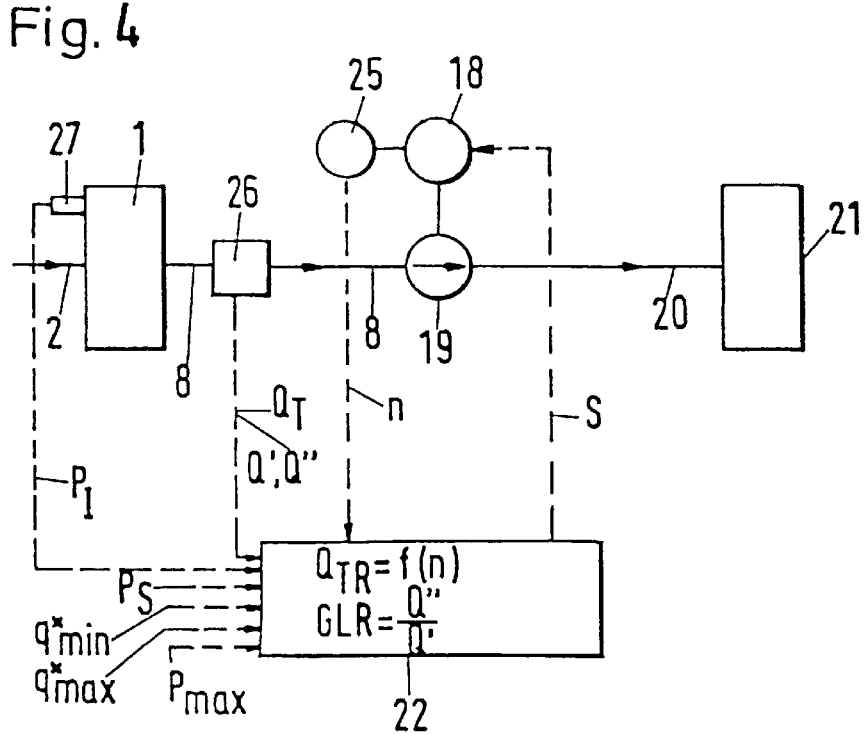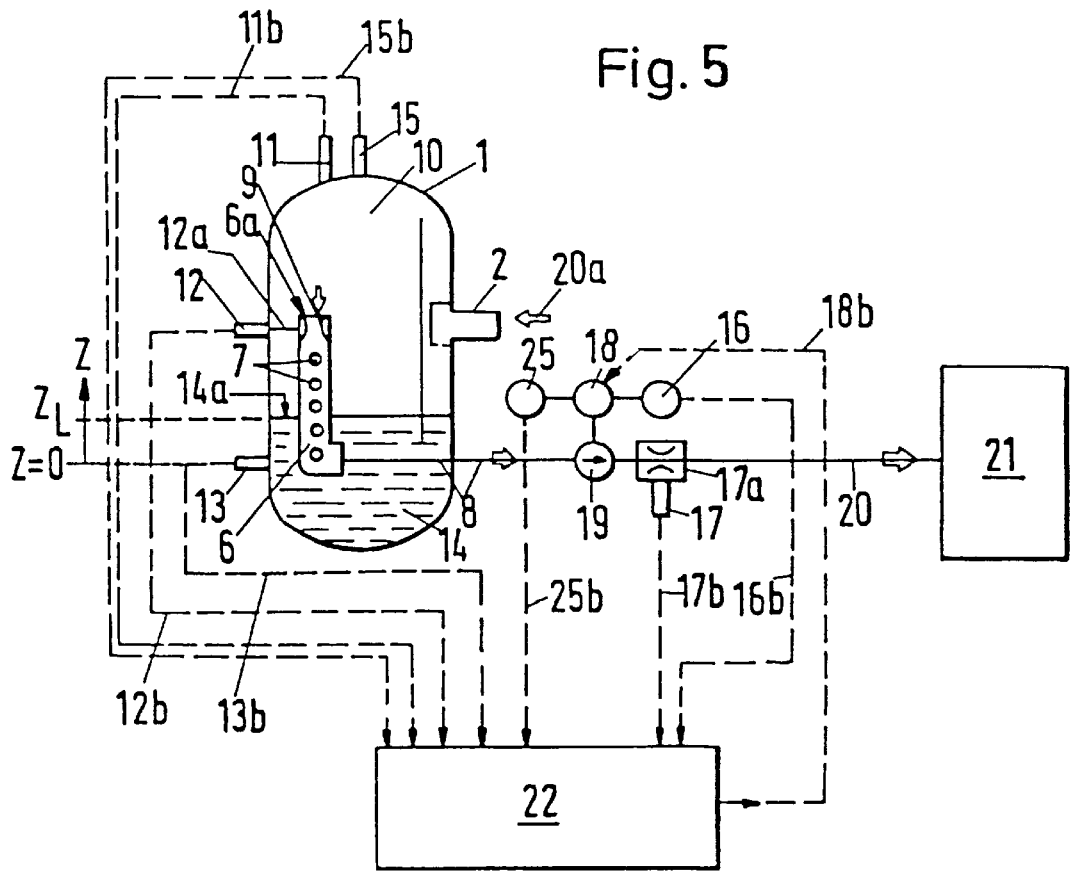

APPARATUS AND METHOD FOR MIXING, MEASURING AND FORWARDING A MULTI-PHASE GAS MIXTURE

BACKGROUND OF THE INVENTION

The invention relates to an apparatus for mixing, measuring and forwarding a multi-phase gas mixture. The invention relates further to a method for operating the apparatus in accordance with the invention. The invention relates further to a buffer tank as well as to a forwarding apparatus with an apparatus in accordance with the invention or operated by the method in accordance with the invention.

A multi-phase gas mixture consists of at least two different phases, for example two fluid components which have a liquid as well as a gas or vapor component respectively. For certain processes it is necessary to mix or to homogenize the fluid components as well as to measure the rate of flow of the fluid flow.

Mixtures of this kind issue from a borehole of a source of crude oil, for example, with the mixture comprising various gases as well as crude oil and possibly also water in addition. Oil wells can have the property that the proportions of liquid and gaseous components vary over a wide range within a short time.

An apparatus for mixing and measuring a multi-phase fluid which uses a densitometer is known from WO 90/13859. This apparatus is used for example in the forwarding of crude oil. Oil wells deliver a mixture consisting of gas, crude oil and also water, whose composition of liquid and gaseous components can vary over a wide range. The known apparatus has a container into which the fluids are conducted as well as a perforated drainage tube in order to conduct the fluids out of the container and to mix them. The container serves as an intermediate storage for the fluids as well as a separator in which the liquid fluid components collect in the lower region of the container and the gaseous fluid components in the upper region of the container. A measuring apparatus is placed after the drainage tube outside the container with a Venturi nozzle in order to measure the flow rate and with a densitometer in order to measure the mass/density of the fluid flow.

This known apparatus has the disadvantage that the measuring apparatus is to be placed outside the container and that the measuring apparatus requires a densitometer, which generally operates with X-rays or gamma rays and is thus correspondingly complicated, expensive and trouble prone.

SUMMARY OF THE INVENTION

The object of the present invention is to provide an apparatus as well as a method for mixing and measuring a multi-phase gas mixture which enables the flow rate and the density of a fluid flow inside a container to be measured in a simple manner.

A further object of the present invention is to provide a method for forwarding a multi-phase gas mixture by means of a multi-phase pump as well as an apparatus comprising a multi-phase pump in order to forward a multi-phase gas mixture whose composition of liquid and gaseous components can be subject to fluctuations.

The invention comprises a removal apparatus with a drainage means in order to drain fluids out of a container. In accordance with the invention, a pressure is measured in the container by means of sensors, in particular the pressure of the gaseous fluid, a pressure in the removal apparatus or in the drainage means, as well as a level of the surface of the liquid forming in the container. With the help of these measured values and a calibration curve of the drainage means or of the removal apparatus respectively, which is known in advance, it is possibility means of a signal evaluation apparatus to determine a flow rate for the gaseous component, a flow rate for the liquid component, as well as further characteristic values such as the relationship between the flow rates of the two components or the total flow rate as the sum of the two components.

The invention is particularly suitable for mixing and measuring a multi-phase fluid issuing from a source of crude oil. The advantages of the invention are to be seen in the fact that the flow rate of the liquid and the gaseous components of a mixed and/or homogenized fluid as well as the average specific mixture density can be determined in a simple manner by means of pressure and temperature sensors. The measuring apparatus is very simple to construct, economical and maintenance-friendly. A further advantage of the invention is to be seen in the fact that the measuring apparatus can be integrated into a container which serves to separate the fluids into a liquid as well as a gaseous component prior to mixing. The container can in particular be executed in such a manner that it is capable of holding a larger volume and serves in such a manner as an intermediate storage or buffer tank in order to compensate for fluctuations in the composition of the liquid and gaseous components. A further advantage of the invention is to be seen in the fact that the measuring apparatus can be integrated into a buffer tank, and in that thereby a forwarding apparatus which follows with respect to the direction of flow, a pump for example, can be arranged either inside or outside the container as desired. In particular it can prove advantageous for deep sea forwarding installations for oil wells that a pump can be integrated inside the buffer tank.

An advantage of the invention is to be seen in the fact that with the measuring apparatus a multi-phase mixture can be forwarded with the help of a pump in a reliable manner. Here a variable of the forwarding process, for example a pressure value, can be measured as an actual value and prescribed as a desired value, with the method in accordance with the invention regulating the rotational speed of the multi-phase pump in such a manner that the actual value attempts to achieve the desired value. A further regulation at higher priority is superimposed on this actual-desired value regulation in order to take operating properties of the multi-phase pump into account, in order to ensure for instance an advantageous operating point of the multi-phase pump or, for instance, to limit a shock-like load on the pump and/or on the drive apparatus.

A further advantage of the invention is to be seen in the fact that the method in accordance with the invention and/or the apparatus in accordance with the invention can be used at oil wells for reducing and/or regulating the pressure present at the borehole opening. The amount flowing out per unit time can thereby be influenced. Furthermore, the yield of an oil well can be increased thereby. Furthermore, an oil well whose crude oil issues only at a low pressure from the borehole can be economically exploited.

A further advantage of the invention is to be seen in the fact that a multi-phase pump can be operated in a reliable manner and thus has a lower susceptibility to trouble so that it is possible to use the multi-phase pump in places which are difficult of access for troubleshooting, such as is the case in deep sea drilling installations.

BRIEF DESCRIPTION OF THE DRAWINGS

FIG. 2 shows a detail section of an inlet point for a supply tube into the container;

FIGS. 3a, 3b, 3c, 3d, 3e, 3f show longitudinal sections of various embodiments of a removal apparatus/a drainage means;

FIG. 4 shows a block diagram of a forwarding apparatus; and

FIG. 5 shows a further apparatus for forwarding a multi-phase gas mixture with a multi-phase pump.

DESCRIPTION OF THE PREFERRED EMBODIMENT

Figure 1A:
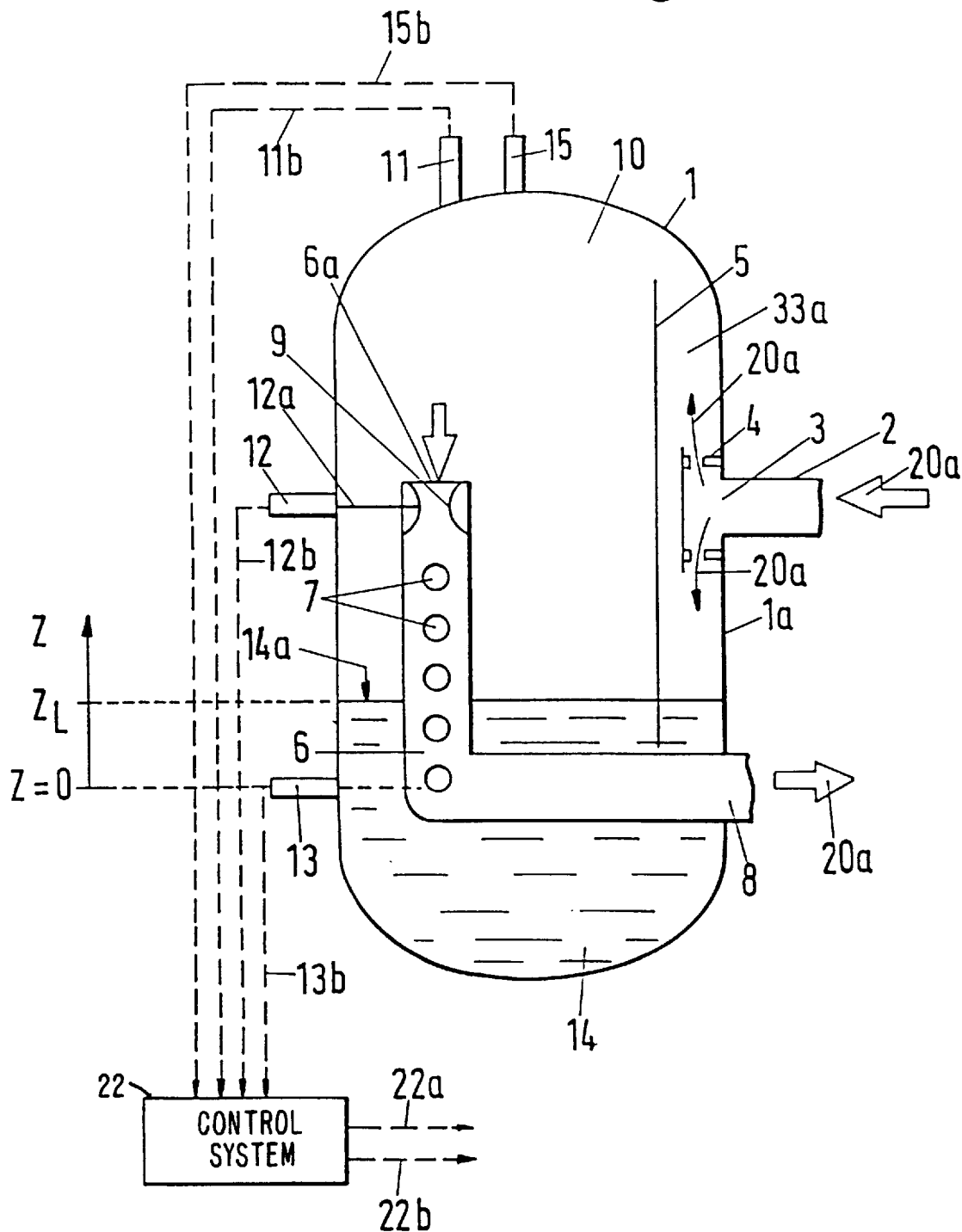
FIG. 1a shows a container with a perforated drainage means and a plurality of sensors.

FIG. 1a shows a container into which a supply tube 2 opens at an inlet opening 3 and supplies the container 1 with a multi-phase fluid flowing in in the flow direction 20a. The liquid and gaseous fluid components are separated in the container 1, with the liquid components collecting in the lower region of the container 1 in a liquid volume 14 and the gaseous components collecting in the upper part of the container 1 as a gas volume 10. A liquid surface 14a forms at the separating layer between the gas volume 10 and the liquid volume 14 whose actual height Z is measured by a sensor 13, with a reference height Z=0 being defined so that an actual height $Z_L$ can always be assigned to the liquid surface 14a. In the present exemplary embodiment a pressure sensor was used as a sensor 13, with further measuring methods which would likewise be suitable for measuring the actual height $Z_L$ of course being known to one of ordinary skill in the art. The fluids located in the container 1 are conducted back out of the container 1 or drawn off in a flowing manner in the direction of flow 20a via a removal device 6, 8 which comprises at least one drainage means 6 as well as a drainage means 8 following it. In the present exemplary embodiment the drainage means 6 is arranged vertically with respect to the liquid surface 14a and has openings 7 which lie partly below and partly above the liquid surface 14a during normal operation. The openings 7 serve in particular for the passage of the liquid components into the drainage means 6, where the diameters of the individual openings 7 can be chosen to be of differing size, and where the arrangement of the openings 7 in the direction of the height Z can be chosen in such a manner that the relationship between the amount of the liquid component draining off and the height $Z_L$ of the liquid surface 14a is favorable. In place of the openings 7, the drainage means 6 can also be provided in the region of its walls with an elongate slit, for example, the breadth of which determines the corresponding amount of drainage of the liquid components. The drainage means 6 is open at its upper end, with the opening forming an inlet opening 6a through which the greatest portion of the gaseous components from the gas volume 10 flow into the drainage means 6. The drainage means 6 has a Venturi nozzle 9 in the region of its inlet opening 6a which is connected to a pressure sensor 12 via a connecting means 12a so that the flow rate of the gaseous component which flows through the inlet opening 6a into the drainage means 6 can be measured. In the place of a Venturi nozzle 9 of course other measuring means are also suitable for measuring a gaseous volume flow, for example an aperture. In the present exemplary embodiment a pressure sensor 11 as well as a temperature sensor 15 are arranged in the region of the gas volume 10 at the upper end of the container 1 in order to measure the temperature of the gaseous component as well as the pressure of the gaseous component. From this, the pressure rho of the gaseous component can be calculated. The removal apparatus can also comprise a plurality of drainage means 6 which all open into the drainage means 8 or are led out of the container separately. A calibration curve was determined for the drainage properties of each drainage means 6 or for the entire removal apparatus 6, 8 respectively with the help of which the flow rates of the gaseous components as well as the flow rates of the liquid components can be calculated from the measured values.

As shown in the present exemplary embodiment, a liquid or jet disperser 4 can be placed after the inlet opening 3 of the container 1 in the direction of flow 20a in order to damp fluctuations in the height $Z_L$ of the liquid surface 14a which are caused by inflowing quantities of liquid and in order to avoid damage by high energy fluid spurts. The liquid disperser 4 reduces or avoids a jerk-like stress on the elements and structures within the container 1. In the present exemplary embodiment the direction of flow 20a of the fluids is deflected in the vertical direction. Furthermore, a partition wall 5 is placed in the container 1 which forms a chamber 33a between the outer wall 1a of the container and the partition wall 5 in the region of the inlet opening 3 with the purpose of damping the movements of the liquid surface 14a. This calming chamber 33a has at least one passageway to the gas volume 10 and to the liquid volume 14 each so that the fluids flowing in via the supply tube 2 enter the volume 14. The drainage means 6 is placed outside the calming chamber 33a. The physical parameters measured by the sensors 11, 12, 13 and 15 are fed to a signal evaluation apparatus 22 via the associated signal: lines 11b, 12b, 13b, 15b which comprises a computer or a microprocessor respectively and corresponding input and output means in order to evaluate the signals and to transmit the computed values via signal lines 22a, 22b to a higher level unit or to a display instrument. The container 1 serves for the mixing and measuring of multi-phase fluids which are conducted in via the supply tube 2. The multi-phase fluids are separated into a gaseous and a liquid component in the container 1. Both the liquid and the gaseous components enter into the drainage means 6, are mixed there, and are led off out of the container 1 via the drainage means 8. The mixing ratio of the liquid and gaseous components in the mixed fluid which flows off depends on the gas pressure in the gas volume 10 as well as on the actual height $Z_L$ of the liquid surface 14a.

Figure 1B:
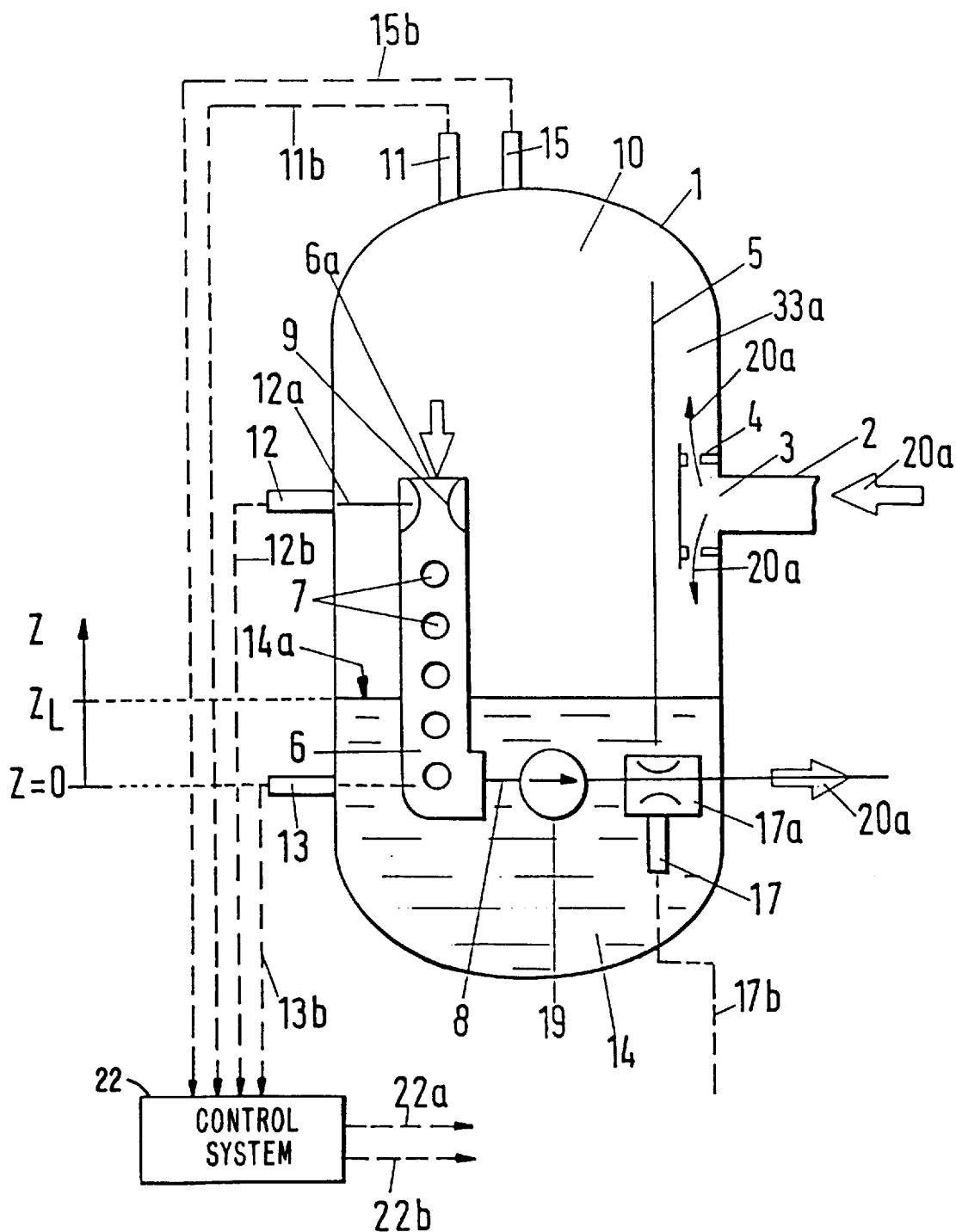
FIG. 1b shows a further container with a drainage means and sensors as well as an integrated forwarding apparatus.

FIG. 1b shows the previously described container 1, which additionally comprises a two-phase pump 19 and possibly a further Venturi nozzle 17a. The drainage means 6 opens into the drainage means 8, which opens into the pump 19, which in turn opens into the Venturi nozzle 17a and thereupon leaves the container 1. The pressure at the Venturi nozzle 17a is measured with a pressure sensor 17 and fed to the computer 22 via a signal line 17b. The flow rate of the homogenized multi-phase fluid can be-calculated from the signal of the pressure sensor 17. The Venturi nozzle 17a can also be placed ahead of the pump 19 with respect to the direction of flow 20a in order to measure the flow rate of the multi-phase fluid. The drive apparatus driving the pump 19 can likewise be integrated into the container 1 or placed outside the container also that the drive apparatus is connected to the two-phase pump 19 via a drive axle passing through the container wall 1a. An advantage of the present arrangement is to be seen in the fact that the pump 19 lies inside the container 1 and is thus protected by it.

FIG. 2 shows the construction of a liquid disperser 4 in detail. A multi-phase mixture flowing in through the supply tube 2 in the direction of flow 20a can fluctuate with respect to the liquid and gaseous components within a large range, so that large amounts of liquid components can be conducted to the inlet opening 3 within short periods of time. The liquid disperser 4 serves to separate the inflowing fluid into several partial flows which thereby flow in different directions in order to protect installations in the container 1 from damage. The illustrated liquid disperser 4 consists of a cover element 34 which is placed directly after the inlet opening 3 in the container and which in the present exemplary embodiment comprises a cylindrical part 30 with apertures 31 as well as a cover part 32 which closes off the part 30 at the one end, with the part 30 being connected at the other end to the inlet opening 3. A partition wall 5 is placed ahead of the liquid disperser 4 so that a calming chamber arises between the container wall 1a and the partition wall 5.

The gaseous and liquid components of the fluid conducted to the container 1 can be subject to substantial temporal fluctuations, as for example in the case of forwarding crude oil. In order to reduce these fluctuations in the subsequent drainage means 8 or in the removal apparatus 6, 8 respectively, it is possible to design the volume of the container 1 in such a manner that the container 1 serves as an intermediate storage and/or as a buffer tank. In this manner the density of the homogenized fluid drawn off can be prevented from. having substantial short-term fluctuations.

It is known that the yield of an oil well can be increased if the pressure at the issue of the borehole is reduced. A preferred application possibility of the container 1 in accordance with the invention thus consists in connecting the supply tube 2 to the issue of the borehole and to connect a pump 19 after the drainage means 8 so that the pressure in the container 1 is reduced. A two-phase pump 19 is preferably placed after the drainage means 8. The values of the multi-phase fluid measured in the container 1 can serve as control values in order to regulate the two-phase pump 19. For the operation or the control respectively of the two-phase pump 19 it is necessary that the average mixture density $\rho_{mix}$ of the homogenized fluid does not increase rapidly within a short time in order to prevent the two-phase pump 19 from being suddenly overloaded or from entering an impermissible range of operation, e.g. a range of operation in which the flow is interrupted.

FIGS. 3a, 3b, 3c, 3d, 3e and 3f show longitudinal sections of different embodiments of removal apparatuses 6, 8 or of drainage means 6 which are perforated or provided with openings 7. An apparatus is designated as a removal apparatus 6, 8 if it serves to draw out the fluids from the inner space 10 and to conduct them out of the container 1 or to conduct them to a multi-phase pump 19 placed inside the container 1, with the removal apparatus 6, 8 effecting as homogeneous a mixture of the fluids as possible. The removal apparatus 6, 8 comprises the drainage means 6, 8. A pressure is measured by means of a pressure sensor 12 in each of the removal apparatuses 6, 8 or drainage means 6. A calibration curve can be determined for each embodiment of the removal apparatuses 6, 8 or of the drainage means 6 respectively which allows the flow rates of the gaseous and liquid fluid components flowing into the removal apparatus 6, 8 to be calculated from the pressure difference between the pressure in the gas volume 10 and the pressure in the removal apparatus 6, 8 and the measured, actual height $Z_L$ of the liquid surface. The drainage means 6, 8 shown in FIGS. 3a–3f are in the normal operating state. During a normal operation the liquid surface 14a fluctuates in a range of height from Z=0 to a maximum height $Z_{max}$, with the actual height of the liquid surface being $Z_L$. During a normal operation of the apparatus in accordance with the invention the drainage means 6 passes through a liquid surface 14a which forms between the liquid and gaseous components.

Figure 3D:
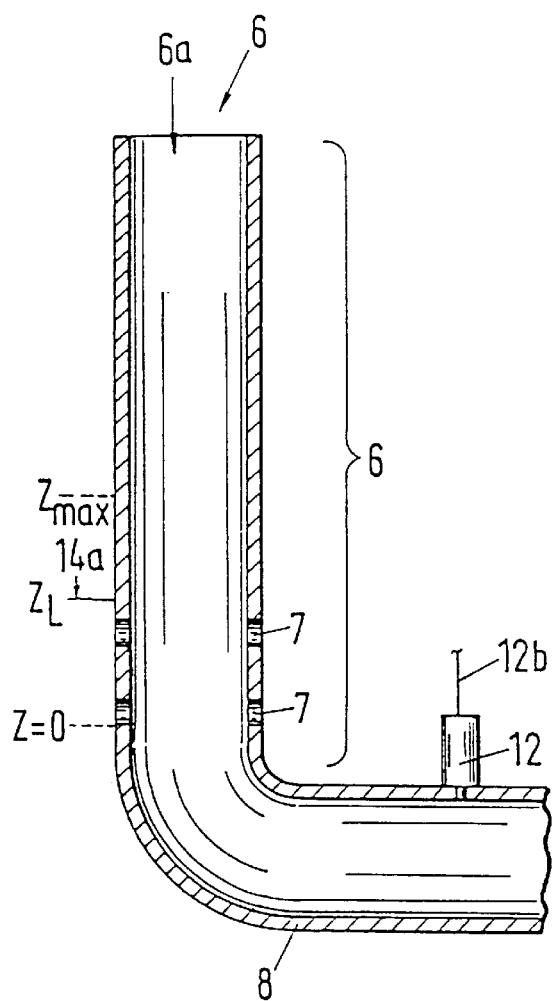
Figure 3E:
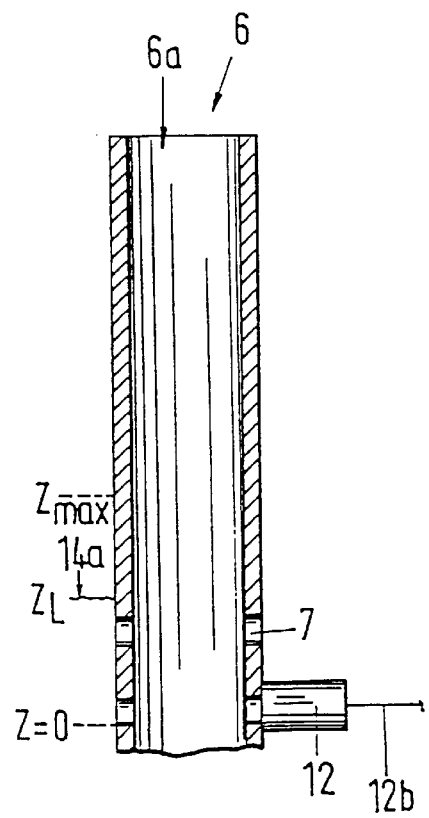
Figure 3F:
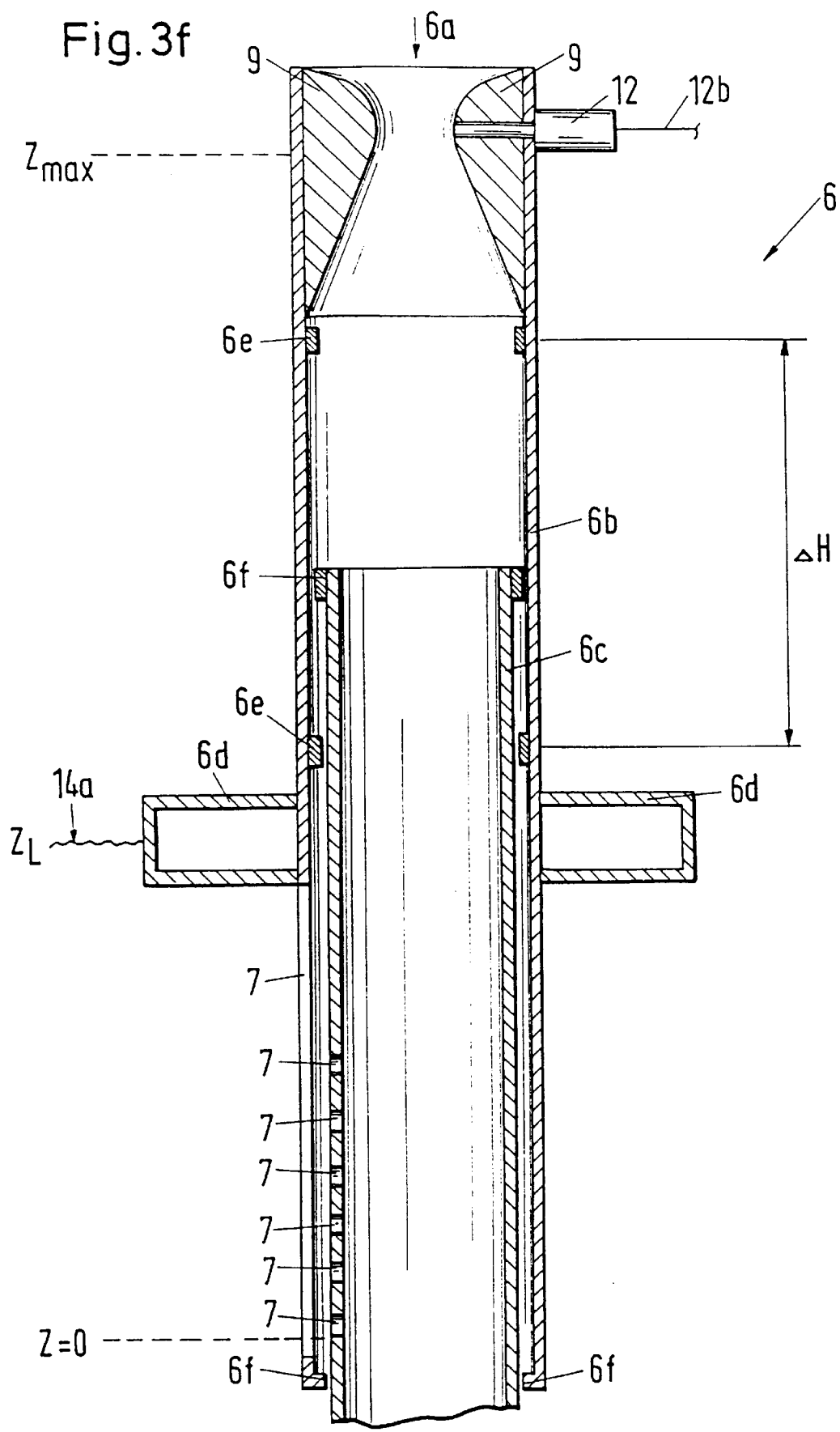

The embodiment of a drainage means 6 shown in FIG. 3a has a Venturi nozzle 9 with a corresponding pressure sensor 12. A Venturi nozzle at the inlet opening 6a has the advantage that the gas flow can be measured relatively precisely. The apertures 7 are arranged in such a manner that all apertures 7 are surrounded by liquid at a maximum liquid level $Z_{max}$. FIG. 3b illustrates a further embodiment of a drainage means 6 which usually has a round cross-section, which is completely open at the upper end and whose pressure sensor 12 is arranged just above the boundary of the maximum liquid level $Z_{max}$. FIG. 3c shows a further embodiment of a drainage means 6 which has a plurality of apertures 7. The three embodiments illustrated are examples of a large number of possible embodiments of a drainage means 6. FIG. 3d shows a further embodiment of a removal apparatus 6, 8 which has a pressure sensor 12 that is arranged at the drainage means 8 in such a manner that the pressure of the mixed fluid is measured within the drainage means 8. FIG. 3e shows a drainage means 6 with a pressure sensor 12 which is placed at a height of Z=0 so that the pressure sensor 12 arranged in this manner likewise measures the pressure of the mixed fluid within the drainage means 8. FIG. 3f shows a further exemplary embodiment of a drainage means 6 which comprises a first, fixed part 6c as well as a part 6b movable in the vertical direction. The fixed part 6c has a guiding part 6f at the top and apertures 7 at the outer wall, and opens at the bottom into a subsequent drainage means 8. The movable part 6b has a guidance part 6f at the bottom in order to define the mutual position of the two parts 6a, 6b in the longitudinal direction. A floater body 6d is mounted on the movable part 6b and experiences a buoyancy by the liquid component so that the position of the floater body 6d and thereby the position of the movable part 6b follows the level $Z_L$ of the liquid surface 14a. Two abutments 6e are arranged in the interior of the movable part 6b which can enter into active contact with the guidance part 6f so that the maximum possible path of the movable part 6b is limited to a difference ΔH. The movable part 6b has an aperture 7 for the passage of the liquid components. The movable part 6b has an inlet opening 6a at the top with a Venturi nozzle 9 and a sensor 12. An advantage of the floater body 6d is to be seen in the fact that it ensures that only gaseous fluid components flow through the inlet opening 6a so that an unambiguous measurement of the gas flow (rate of flow of the gaseous fluid components) with a measuring apparatus, which e.g. can also be executed as an aperture, is possible at the inlet opening 6a. It is advantageous here to arrange the drainage means 6 inside the container 1 in such a manner that only liquid components flow through the apertures 7 and only gaseous components flow through the inlet opening 6a into the drainage means 6 so that the measuring apparatus at the inlet opening 6a measures the total portion of the gaseous fluid components flowing into the drainage means 6. The measurement of the height $Z_L$ of the liquid surface 14a can be performed in the present exemplary embodiment by means of a path sensor which measures the movement of the movable part 6b in the longitudinal direction.

The method for mixing and measuring a flowing multiphase fluid which is suitable for the operation of the previously described apparatus will be discussed in more detail in the following.

For each geometrical embodiment of a drainage means 6 or a removal apparatus 6, 8 an experimental or computational relationship is established in advance in order to be able to determine a flow rate Q' of the liquid components as a function of the height $Z_L$ of the liquid surface 14a as well as the flow rate Q" of the gaseous components. For this purpose a relative liquid level FLL is defined which describes the relationship between an actual, measured height $Z_L$ of the liquid surface 14a and a theoretical height $Z_{L,th}$ of a liquid surface 14a. The theoretical height $Z_{L,th}$ designates that height of the liquid surface 14a which would be present at the drainage means 6 if no gaseous component were flowing through the drainage means 6, that is, if the flow rate Q" were equal to 0. The velocity c of the gas can be calculated from the gas flow Q". For each geometrical embodiment of a drainage means 6 the relationship: $FLL = f(rho^* c^2)$ is established experimentally or computationally (FLL is a function of $(rho^* c^2)$). The relationship is dependent among other things on the size of the inner diameter of the drainage means 6 as well as on the arrangement and on the diameters of the openings 7.

For carrying out the method, a computer 22, comprising a processor with a ROM and a RAM as well as input and output means, is used in order to read in the measured values of the sensors 11, 12, 13, 15 via signal lines 11b, 12b, 13b, 15b and to display the computed values or to transmit them via signal lines 22a, 22b to a further apparatus. The experimental or computational relationship $FLL = f(rho^* c^2)$, which represents a calibration curve for the drainage means 6 located in the container 1 or for the selected arrangement respectively, is stored in the computer 22 in the memory unit.

The method in accordance with the invention comprises the following steps:

1. The fluids are conducted to the container 1 via the supply tube 2 and separated into their liquid and gaseous components, while a liquid surface 14a with an actual height $Z_L$ is formed.
2. The actual height $Z_L$ of the liquid surface 14a is measured by means of a sensor 13, which in the present exemplary embodiment is executed as a pressure sensor.
3. The flow rate Q" of the gaseous component, which flows into the drainage means 6, can be calculated from a pressure difference between the pressure in the gas volume 10 and the pressure in the drainage means 6 or in the drainage means 8 respectively while taking the actual height $Z_L$ into account with the help of a calibration curve of the drainage means 6. Gaseous components also pass into the drainage means 6 through those openings 7 which lie above the liquid surface 14a. These gaseous components are taken into account through the calibration curve in the calculation of the flow rate Q".
4. The temperature and the pressure of the gaseous components are measured in the gas volume 10 and the gas density rho calculated therefrom.
5. The speed of the gas c can be calculated from the flow rate Q" and the gas density rho. With the help of the experimental or the calculated relationship $FLL = f(rho^* c^2)$, a theoretical height $Z_{L,th}$ can be calculated from the measured height $Z_L$.
6. The flow rate Q' of the liquid component flowing into the drainage means 6 can be calculated from the theoretical height $Z_{L,th}$ present at the drainage means 6 through integration over the height of the drainage means while taking the arrangement of the openings 7 into account.
7. Once the flow rates of the liquid component Q' and the gaseous component Q" are known, the following quantities can be calculated in a simple manner:
    the ratio of the gaseous components to the liquid components: GLR=Q"/Q'
    the mixture density $rho_{mix}$
    the flow rate $Q_{mix}$ of the mixed fluid as the sum of Q' and Q".
8. The liquid and gaseous components are mixed in the drainage means 6 and homogenized so that the fluid leaves the container 1 in a homogenized state.

In accordance with the invention the flow rate Q" can also be determined with an aperture, an inlet nozzle, such as e.g. the nozzle 9 illustrated in FIG. 3f, or a pressure difference measurement via other openings. This measurement can also be accomplished by other devices for the measurement of a through-flow.

The liquid rate Q" of the gaseous components as well as the flow rate Q' of the liquid components which flow through the removal apparatus 6, 8 can be calculated by a further method in accordance with the invention. This method solves an equation with two unknowns by an iteration procedure.

The unknown quantities are Q' and Q". The geometry of the removal apparatus 6, 8 as well as its experimentally determined property $FLL = f(rho^* c^2)$ are known. Furthermore, the density rho' of the fluid components is assumed to be approximately constant and known.

This further method in accordance with the invention comprises the following steps:

1. The fluids are conducted to the container 1 via the supply tube 2 and separated into liquid and gaseous components while a liquid surface 14a is formed with an actual height $Z_L$.
2. The pressure as well as the temperature of the gaseous components in the gas volume 10 of the container 1 is measured, from which the gas density rho is calculated.
3. The actual height $Z_L$ of the liquid surface 14a is measured.
4. Furthermore, a pressure of the homogenized fluid in the removal apparatus 6, 8 is measured, for example in an arrangement of a sensor 12 in accordance with FIG. 3d or for example with a Venturi nozzle 17a in accordance with FIG. 1b, where the Venturi nozzle 17a can be placed after the multi-phase pump 19 as shown in FIG. 1b, or else ahead of the multi-phase pump 19.
5. A ratio figure a for the volumetric proportions between Q' and Q" is assumed.
6. The average mixture density $rho_{mix}$ is calculated from the ratio figure a for the volumetric proportions, with the densities rho and rho' being known.
7. The flow rate $Q_{mix}$ of the homogenized fluid is measured (calculated) from the pressure measured in step 4.
8. The flow rate Q" of the gaseous components as well as the flow rate Q' of the liquid components are calculated from the flow rate $Q_{mix}$ via the ratio figure $\alpha$.
9. The gas velocity c is calculated from the flow rate Q", the gas density rho, and the geometry of the removal apparatus 6, 8.
10. A theoretical height $Z_{L,th}$ is calculated from the measured height $Z_L$ with the help of the relationship $FLL = f(rho^* c^2)$.
11. From the theoretical height $Z_{L,th}$ present at the drainage means 6 the flow rate Q' of the gaseous components entering into the drainage means 6 can be calculated by integration over the height of the drainage means while taking the arrangement of the openings 7 into account.
12. A new ratio figure $\alpha_1$ between the flow rate Q' of the fluid components and the flow rate Q" of the gaseous components is calculated.
13. The calculated ratio figure $\alpha_1$ is compared with the assumed ratio figure $\alpha$. If the two ratio figures differ from one another by more than a predeterminable amount, a new ratio figure $\alpha$ is assumed and the iteration is resumed beginning at step 6. Otherwise the iteration is discontinued and the values sought for Q' and Q" are present.

Once the flow rates of the liquid components Q' as well as the gaseous components Q" are known, the following quantities can be calculated in a simple manner.

the ratio of the gaseous components to the liquid components: GLR=Q"/Q' the mixture density $\rho_{mix}$ the flow rate $Q_{mix}$ of the mixed fluid as the sum of Q' and Q".

Measuring the temperature of the gaseous components in the gas volume 10 of the container 1 can be dispensed with if the temperature is known by other means and, say, remains constant. FIG. 4 shows a forwarding apparatus between a container 1 and a processing plant 21 in order to convey a multi-phase mixture flowing through a supply tube 2 into the container 1 via a drainage tube 8, a multi-phase pump 19, and a pump drainage tube 20 to the processing plant 21 in the direction of flow 20a. The multi-phase pump 19 is connected via a shaft 18a to a drive device 18 as well as to an apparatus 25 for measuring the rotational speed. An electric motor serves as a drive device 18 in the present embodiment, although other drives, such as e.g. an internal combustion engine, would also be suitable. A measuring apparatus 26 in accordance with the invention is placed ahead of the pump 19 in the direction of flow 20a in order to measure a flow rate $Q_T$ of the multi-phase mixture flowing through the drainage tube 8. Furthermore, the measuring apparatus 26 measures a flow rate Q' of the liquid components and a flow rate Q" of the gaseous components, which are transferred to the control system 22. From this the control system 22 calculates a ratio figure GLR=Q"/Q'. A process variable is measured as an actual value $P_I$ by a measuring apparatus 27. A signal evaluation and control system 22 which also comprises input and output means receives the measured values n, $Q_T$ and $P_I$ and produces a setting value S in order to control the drive device 18 and to regulate its rotational speed n in particular. The control system 22 preferably comprises a computer or microprocessor respectively for calculating the setting value S.

A distinction is to be made among various operating states in the regulation of the pump 19 for forwarding the multi-phase mixture.

First operating state: Normal operation The control system 22 is provided with a desired value $P_S$ which can be set. A process variable is measured with a measuring apparatus 27 and this desired value $P_I$ is supplied to the control system 22. During a normal operation the control system 22 strives to regulate the rotational speed n of the pump 19 via the setting value S in such a manner that the actual value $P_I$ corresponds to the desired value $P_S$. In the forwarding of the multi-phase mixture there is a plurality of process variables which would be suitable for the regulation. A pressure of the multi-phase mixture in an apparatus 1 which is placed ahead of the pump 19 with respect to the direction of flow 20a is suitable, for example, as the process variable for measuring an actual value $P_I$, as is shown in FIG. 1a. The apparatus 1 is preferably executed as a buffer tank. Further, alternative process variables are, for example, a pressure of the multi-phase mixture in an apparatus 21 which is placed after the pump 19 with respect to the direction of flow 20a, or a pressure difference across the pump 19, or the flow rate $Q_T$. In a preferred embodiment the pressure present at the issue opening of the oil well or the pressure in the buffer tank respectively is used as a process variable, which is measured as an actual value $P_I$ and held substantially constant by the control system. The desired value $P_S$ can be changed by a higher level steering unit or by the operating personnel.

Second operating state: Monitoring a permissible operating range of the pump In this operating state the power characteristics of the pump 19 are also taken into account for the regulation of the rotational speed n in order to ensure that the pump is being operated in a permissible operating state. Every pump has a so-called best [efficiency] point (BEP) which is characterized by an ideal efficiency, with the flow rate forwarded at this point being designated as the ideal forwarding flow $Q_{TR}$. In addition to the geometry, the best [efficiency] point depends on the rotational speed n of the pump. The data required for calculating the ideal forwarding flow $Q_{TR}$ as a function of the actual rotational speed n are stored in the control system 22. The actual flow rate $Q_T$ may deviate from the ideal forwarding flow $Q_{TR}$ only by a definite amount, otherwise a breaking off of the flow, oscillations or pulsations arise in the pump 19. The limiting values at which these effects can arise are designated as a pump limit. A limiting value can be prescribed to the control system 22, above which the actual flow rate $Q_T$ has to lie in order to avoid these disadvantageous effects. In the present embodiment a limiting value is prescribed to the control system 22 through a value $q^*_{min}$, with this value describing a ratio figure $Q_T/Q_{TR}$ so that when a value for $Q_{TR}$ and $q^*_{min}$ is prescribed, a flow rate $Q_{Tmin}$ is determined. The control system 22 continually calculates the ratio $Q_T/Q_{TR}$ anew. A multi-phase pump can be operated in such a manner that: only the limiting value is constantly monitored in order to ensure that the pump limit is never fallen short of. If in addition an actual value $P_I$ is regulated by the control system, then the monitoring of the limiting value is performed at a higher priority than the regulation of the actual value $P_I$ in order to continually ensure that the pump limit is never fallen short of. If the limiting value $q^*_{min}$ is fallen short of, then the rotational speed n is increased in order to operate the multi-phase pump above the pump limit. Thus in this case a discrepancy between the actual value $P_I$ and the desired value $P_S$ is allowed in order to maintain the limiting value in return. A limiting value can be specified as a relative value, e.g. 85% of $Q_{TR}$, or as an absolute value, e.g. as a value $Q_{min}$ of the control system 22.

The permissible operating range of a multi-phase pump is further limited by a maximum permissible flow rate $Q_{max}$, with the maximum permissible flow rate $Q_{max}$ depending on the rotational speed n. A ratio figure $Q_T/Q_{TR}$ can be defined as a further limiting value $q^*_{max}$ so that when a value for $Q_{TR}$ and $q^*_{max}$ is prescribed, a flow rate $Q_{Tmax}$ is determined. The control system 22 monitors the limiting value $q^*_{max}$, with the rotational speed n being reduced when the prescribed limiting value $q^*_{max}$ is exceeded. In this manner an operating range for the multi-phase pump can be prescribed by the two limiting values $q^*_{min}$ and $q^*_{max}$.

In the regulation of the pump 19 for forwarding the multi-phase mixture a further operating state can be monitored.

Third operating state: Monitoring the power If the pump has a high rotational speed n, which occurs in particular at higher values of the ratio figure GLR or at low mixture densities respectively, it is necessary to reduce the rotational speed n as soon as the mixture density increases in an unallowable manner. There is a danger, in particular when the mixture density rises rapidly, that the drive device 18 will be overloaded, that a permissible torque will be exceeded, or that the pump will be damaged, for example at a bearing or a scoop or blade. Monitoring the power delivered by the drive device 18 serves to protect the forwarding apparatus from mechanical damage. The power delivered can be measured, for example, by measuring the power consumed by the electric motor 18. The power delivered can also be calculated approximately as a function of the rotational speed n or as a function of the ratio figure GLR. In the embodiment of FIG. 1b the control system 22 performs a monitoring of the power at the highest priority, with the control system deriving the maximum permissible power from the ratio figure GLR, and with the control system 22 reducing the rotational speed n when the maximum power $P_{max}$ is exceeded. Monitoring the pump limit as well as regulation of the actual value $P_I$ takes place at lower priority.

FIG. 5 shows the apparatus in accordance with the invention together with a buffer tank 1. The supply tube 2 is connected to the borehole of an oil well so that the outflowing multi-phase mixture flows into the buffer tank 1 in the direction of flow 20a. In the buffer tank 1 the liquid and gaseous components are separated, and a liquid volume 14 as well as a gas volume 10 form which are separated from one another by a liquid surface 14a. A drainage means 6 with apertures 7 penetrates the liquid surface 14a so that both liquid and gaseous components arrive at the multi-phase pump 19 via the drainage means 6 and a following drainage means 8 and enter into the processing plant 21 via a following pump drainage tube 20. The drainage means 6 has an inlet opening 6a with a Venturi nozzle 9 in order to measure the inflowing gas flow with a pressure sensor 12. Furthermore, a pressure sensor 11 is mounted on the buffer tank 1 in order to measure the pressure in the gas volume 10, a temperature sensor 15 in order to measure the temperature of the gas volume 10, as well as a pressure sensor 13 in order to measure an actual height $Z_L$ of the liquid surface 14a. The measured values are supplied via electrical signal lines 11b, 12b, 13b, 15b to the control system 22. From the measured values the control system 22 calculates the values required for the regulation, such as the flow rate $Q_T$, the flow rate Q' of the liquid components, the flow rate Q" of the gaseous components, or the actual value $P_I$. The required measured values can be measured directly at the buffer tank. This has the advantage that the pump 19 can be located either inside or outside the buffer tank 1 as desired. Furthermore, the control system 22 measures the rotational speed n of the pump 19 by means of a rotary speed measurement device 25, the power delivered to the pump 19 with a power measurement apparatus 16, as well as a further measured value for the actual flow rate $Q_T$ by means of a Venturi nozzle 17a with a pressure sensor 17 in order to improve the precision of the measurement of the flow rate $Q_T$ by a second measurement. The measured values are supplied via electrical signal lines 16b, 17b, 25b to the control system 22, processed by the control system 22, and serve for the computation of a control variable S, which is supplied to the drive device 18 via the signal line 18b.

I claim:

1. Apparatus for mixing and measuring a multi-phase fluid with at least one liquid and one gaseous component comprising:
   a container for separating the liquid and gaseous components;
   a supply tube which opens into the container;
   a removal apparatus for drawing off the liquid and gaseous components, the removal apparatus comprising a drainage means with apertures that is arranged in such a manner that it penetrates a liquid surface which forms between the liquid and gaseous components during a normal operation;
   a sensor for measuring a value of a pressure in the container;
   a sensor for measuring a value of a pressure in the removal apparatus; and
   at least one sensor for measuring a value of a height ($Z_L$) of the liquid surface,
   where the sensors are connected to a signal reception and evaluation system via signal lines for calculating at least a flow rate (Q") of the gaseous component and a flow rate (Q') of the liquid component from the measured values.

2. Apparatus in accordance with claim 1 wherein the drainage means has an inlet opening which lies above the liquid surface during normal operation; and a through-flow measurement apparatus with a sensor is arranged at the inlet opening.

3. Apparatus in accordance with claim 1 wherein the removal apparatus comprises a plurality of drainage means, with a sensor being placed at at least one drainage means.

4. Apparatus in accordance with claim 1 wherein the sensor for measuring the value of the pressure in the container and a temperature sensor monitor the gaseous component lying above the liquid surface to determine its density therefrom.

5. Apparatus in accordance with claim 1 wherein the supply tube enters into the container at an inlet opening; the inlet opening is closed off by a cover element; and the cover element has a plurality of apertures for dividing an inflowing fluid into a plurality of partial flows which flow in different directions.

6. Apparatus in accordance with claim 5 wherein the cover element comprises a cylindrical part with apertures and a cover part which closes off the cylindrical part at one end; and the cylindrical part is connected to the inlet opening on the other end.

7. Apparatus in accordance with claim 5 wherein a partition wall is arranged in the container in such a manner that an intermediate space forms between a container wall and the partition wall;
   the partition wall has passages to the remaining inner space of the container;
   the inlet opening opens into the intermediate space for reducing fluctuations of the liquid surface; and
   the drainage means lies outside the intermediate space.

8. Apparatus in accordance with claim 1 wherein the drainage means is connected to a pump which is placed inside the container.

9. Apparatus in accordance with claim 8 wherein a through-flow measuring apparatus is placed ahead of the pump in the direction of flow for measuring a flow rate ($Q_{mix}$) of a mixed fluid of the liquid and gaseous components, with the through-flow measuring apparatus being placed inside the container.

10. Apparatus in accordance with claim 8 wherein a through-flow measuring apparatus is placed after the pump in the direction of flow for measuring a flow rate ($Q_{mix}$) of the mixed fluid, with the through-flow measuring apparatus being placed inside the container.

11. Apparatus in accordance with claim 8 wherein a through-flow measuring apparatus is placed ahead of the pump in the direction of flow for measuring a flow rate ($Q_{mix}$) of the mixed fluid, with the through-flow measuring apparatus being placed outside the container.

12. Deep sea forwarding plant or land forwarding plant for oil wells, comprising a buffer tank or pump and an apparatus in accordance with claim 1.

13. Apparatus in accordance with claim 1 wherein the drainage means is connected to a pump which is placed outside the container.

14. Method for mixing and measuring a flowing, multi-phase fluid using a container coupled to a removal apparatus, comprising the steps of:

conducting a liquid to the container and separating therein the liquid into a liquid component and a gaseous component divided by a liquid surface;

conducting the liquid and gaseous components out of the container;

mixing the liquid and gaseous components in the removal apparatus;

measuring a value of an actual height ($Z_L$) of the liquid surface;

measuring a value of a pressure of the gaseous component in the container;

measuring a value of a pressure in the removal apparatus; and calculating from the measured values a flow rate ($Q'$) of the liquid component and a flow rate ($Q''$) of the gaseous component using a calibration curve stored in the removal apparatus.

15. Method in accordance with claim 14 further comprising the steps of measuring a value of a temperature of the gaseous component in the container and calculating from the measured values a density (rho) of the gaseous component.

16. Method in accordance with claim 14 further comprising the step of calculating a ratio between the flow rate ($Q''$) and the flow rate ($Q'$).

17. Method in accordance with claim 14 further comprising the step of calculating an average gas density ($rho_{mix}$) of the mixed fluid from the flow rates ($Q'$) and ($Q''$).

18. Method in accordance with claim 14 further comprising the step of calculating a flow rate ($Q_{mix}$) of the mixed fluid from the flow rates ($Q'$) and ($Q''$).

19. Method for mixing and measuring a flowing, multi-phase fluid using a container coupled to a removal apparatus, comprising the steps of:

conducting a liquid to the container and separating therein the liquid into a liquid component and a gaseous component separated by a liquid surface;

conducting the liquid and gaseous components out of the container;

mixing the liquid and gaseous components in the removal apparatus;

measuring a value of an actual height ($Z_L$) of the liquid surface;

measuring a value of a pressure of the gaseous component in the container;

calculating from the measured values a pressure in the removal apparatus; and calculating from the measured values a flow rate ($Q'$) of the liquid component and a flow rate ($Q''$) of the gaseous component using a calibration curve stored in the removal apparatus.

* * * * *